T. H. MACDONALD.
SOUND BOX FOR TALKING MACHINES.
APPLICATION FILED MAY 10, 1911.
1,014,240.
Patented Jan. 9, 1912.
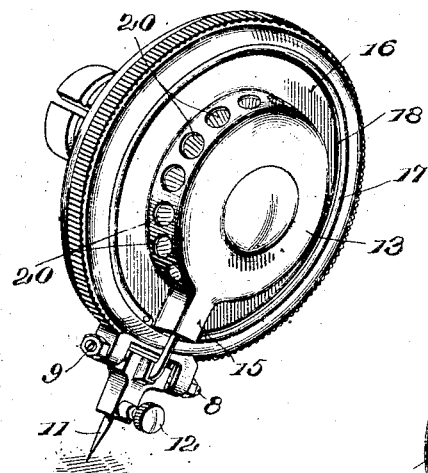
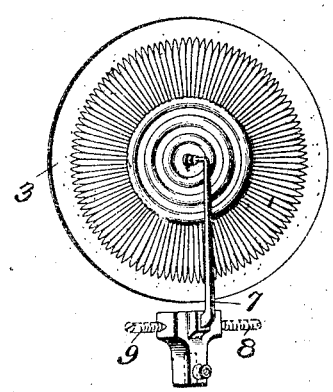
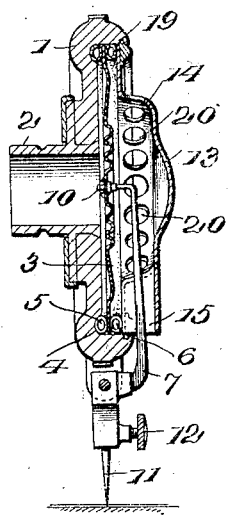
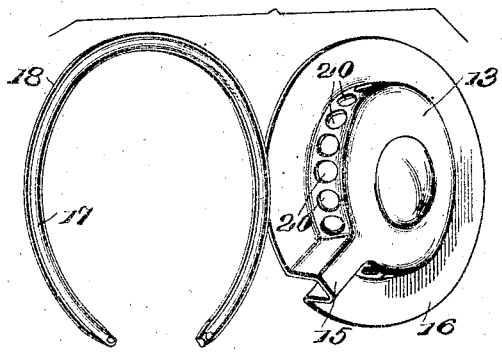
Witnesses
R. C. Fitzhugh
E. E. Warfield
Inventor
Thomas H. Macdonald
By Mauro, Cameron, Lewis & Massie
Attorneys

UNITED STATES PATENT OFFICE.

THOMAS H. MACDONALD, OF BRIDGEPORT, CONNECTICUT, ASSIGNOR TO AMERICAN GRAPHOPHONE COMPANY, OF BRIDGEPORT, CONNECTICUT, A CORPORATION OF WEST VIRGINIA.

SOUND-BOX FOR TALKING-MACHINES.

1,014,240.

Specification of Letters Patent. Patented Jan. 9, 1912.

Application filed May 10, 1911. Serial No. 626,257.

*To all whom it may concern:*

Be it known that I, THOMAS H. MACDONALD, of Bridgeport, Connecticut, have invented a new and useful Improvement in Sound-Boxes for Talking-Machines, which invention is fully set forth in the following specification.

This invention relates to sound-boxes for talking machines, and has more particular reference to the means provided for protecting the diaphragms of such sound-boxes from injury. It has heretofore been proposed to provide a cover for the exposed side of the diaphragm in such sound-boxes, which cover was arranged to slip over the exterior portion of the sound-box frame, or was provided with means for securing such cover in position on the frame independent of the means for securing the diaphragm in position in the frame. It has been deemed desirable to have openings through the said cover, and as heretofore constructed, these openings have been such that any sharp-pointed instrument projecting through the openings could extend in a right line into contact with and injure the diaphragm.

The present invention has for its object to provide a sound-box for talking machines, having a diaphragm and cover, both of which are secured in position by the same means, and which cover is provided with openings which are so arranged in the cover that any sharp-pointed instrument or other projection entering through the openings cannot come in contact with or injure the diaphragm.

With this object in view, the invention consists in a suitable sound-box frame having a diaphragm retained between two suitable gaskets, preferably of rubber, a sound-box cover resting upon the outer gasket, and an elastic expansion ring for retaining the parts in position by the engagement of the ring with an undercut groove formed in the inner wall of the sound-box chamber.

The invention will be best understood by reference to the accompanying drawings, in which—

Figure 1 is a perspective view of a sound-box with the cover in position; Fig. 2 is a vertical central section through such box; Fig. 3 is a plan view of the diaphragm, with the stylus-bar in position thereon; and Fig. 4 shows the cover and the ring for retaining the parts in their assembled position.

Referring to the drawings, in which like reference numerals indicate like parts, 1 indicates the sound-box frame, having a central hub 2 projecting therefrom, and 3 indicates the diaphragm, which may be of any suitable construction and material, such as a metallic diaphragm made, for example, of aluminum. Seated within a suitable annular groove 4 in the sound-box chamber is an annular gasket 5, of rubber or other suitable material, upon which the diaphragm 3 rests. Above the diaphragm 3 is a second annular gasket 6, the parts being so arranged that the periphery of the diaphragm 3 is held between two annular gaskets 5 and 6.

7 is the stylus-bar, suitably supported on the frame of the sound-box by pivot-points 8 and 9, preferably in the form of screws, the stylus bar being secured to the center of the diaphragm in the usual or any suitable way, as at 10, and 11 is the stylus proper, secured in a suitable socket in the stylus bar by a set screw 12.

The cover 13 is here shown in the form of a metal plate struck up so as to present substantially vertical walls 14, with a neck or opening 15, through which opening the stylus bar 7 extends, as clearly shown in Figs. 1 and 2. This cover 13 has its flat annular periphery 16 resting upon the outer gasket 6, and an elastic split ring 17 is provided, having an exterior flange 18, while in the walls of the sound-box chamber there is formed a groove 19, for the reception of the flange 18 on the ring. The split ring is placed in position upon the top of the periphery of the cover 13, and the ring being slightly collapsed, the whole is pressed down against the rubber gaskets until the flange 18 on the ring comes opposite the groove 19 in the chamber of the sound-box, when, by permitting the ring to expand radially, the flange 18 enters the groove 19, and all of the parts, viz., the diaphragm, the two gaskets and the cover, are thus securely retained in position by a single retaining means, to wit, the split ring 17.

In the vertical struck-up walls 14 of the cover 13 are provided suitable openings 20, and as these openings lie in a plane substantially perpendicular to the surface of the diaphragm, it will be readily understood that any sharp instrument or other device entering the openings will not impinge upon and injure the diaphragm, thus avoiding the difficulty heretofore experienced when the openings have been in a plane of the cover parallel with the surface of the diaphragm. Moreover, the stylus-bar is itself protected throughout a greater portion of its extent from injury by being struck by any exterior object which would tend to either injure the stylus-bar itself or the diaphragm or its connection to such diaphragm.

It will be observed that I have thus provided a sound-box with an efficient cover or protector for the diaphragm and the stylus-bar, which is held in position by the same retaining means that holds the diaphragm and gaskets in position, thus cheapening and simplifying the construction, and I have, at the same time, provided suitable openings for the air or sound-waves in the sound-box, which openings, however, will not permit of injury to the diaphragm by anything projecting through such openings.

Having thus described the invention, what is claimed is:—

1. In a sound-box for talking machines, a sound-box frame having a diaphragm-receiving chamber, a diaphragm in said chamber, two gaskets in said chamber, one on each side of the periphery of the diaphragm, a cover resting upon the outer gasket, and an elastic retaining ring resting upon the periphery of said cover and having a flange entering an annular groove in the said diaphragm chamber, whereby all the parts are secured in position by said ring.

2. In a sound-box for talking machines, a sound-box frame provided with a diaphragm chamber, a diaphragm in said chamber, a cover over said diaphragm, which cover is provided with a wall or portion extending substantially at right angles to the surface of the diaphragm, and having openings or perforations formed in said wall or portion.

In testimony whereof I have signed this specification in the presence of two subscribing witnesses.

THOMAS H. MACDONALD.

Witnesses:
ANNA R. DRAPER,
ELSIE E. CARTMEL.